United States Patent
Rechichi

(10) Patent No.: US 6,200,381 B1
(45) Date of Patent: Mar. 13, 2001

(54) SETTABLE COMPOSITION AND USES THEREFOR

(75) Inventor: Dino Rechichi, Reedy Creek (AU)

(73) Assignee: Periclase Pty. Ltd., Reedy Creek (AU)

( * ) Notice: Subject to any disclaimer, the term of this patent is extended or adjusted under 35 U.S.C. 154(b) by 0 days.

(21) Appl. No.: 09/346,588

(22) Filed: Jul. 2, 1999

Related U.S. Application Data

(63) Continuation-in-part of application No. 08/930,238, filed as application No. PCT/AU96/00774 on Dec. 3, 1996, now abandoned.

(30) Foreign Application Priority Data

Dec. 5, 1995 (AU) .................................................... PN6955
Oct. 11, 1996 (AU) .................................................... PO2895

(51) Int. Cl.[7] .................................................... C04B 9/11
(52) U.S. Cl. .................................................... 106/801
(58) Field of Search .................................................... 106/800, 801, 106/802, 803

(56) References Cited

U.S. PATENT DOCUMENTS

| 3,932,578 | * | 1/1976 | Nishino et al. | 264/331 |
|---|---|---|---|---|
| 4,240,825 | * | 12/1980 | Tamas | 106/800 |
| 4,760,039 | * | 7/1988 | Hlawatschek | 105/801 |
| 4,889,640 | * | 12/1989 | Stanforth | 210/751 |
| 5,194,087 | * | 3/1993 | Berg | 196/18.12 |
| 5,401,310 | * | 3/1995 | Ture | 106/802 |
| 5,584,926 | * | 12/1996 | Borgholm et al. | 106/800 |
| 5,669,968 | * | 9/1997 | Kobari et al. | 105/800 |

FOREIGN PATENT DOCUMENTS

| 232035 | * | 1/1986 | (DE) . |
|---|---|---|---|
| 148460 | * | 2/1981 | (IN) . |
| 08012387 | * | 1/1996 | (JP) . |
| 172217 | * | 1/1966 | (SU) . |
| 1756298 | * | 8/1992 | (SU) . |
| 1807026 | * | 1/1993 | (SU) . |

OTHER PUBLICATIONS

Derwent Soviet Inventions Illustrated, Section 1, Chemical, Issued.
Jan. 1966, General Inorganic, ETC., p. 10, SU 172217 (Bogomolov), Jan. 1966.
Derwent Abstract Accession No. 94–198555/24, SU 18070126 A.
(TOMSK POLY) Apr. 7, 1993.
Derwent Abstracts Accession No. 93–257218/32, SU 1756298 A (As Sibe Solid State Chem Inst) Aug. 23, 1992.

* cited by examiner

*Primary Examiner*—Paul Marcantoni
(74) *Attorney, Agent, or Firm*—Collard & Roe, P.C.

(57) ABSTRACT

A dry powdered flowable cement composition contains calcium carbonate and a partially decarbonated magnesium carbonate. A slurry of the composition will set hard with various organic fillers including waste products and toxic waste. The composition can be slurried with contaminated water such as sea water, mineral laden ground water and muddy water. A high percentage of filler can be added while still having an acceptable set.

20 Claims, No Drawings

SETTABLE COMPOSITION AND USES THEREFOR

CROSS-REFERENCE TO RELATED APPLICATIONS

This patent application is a continuation-in-part patent application of U.S. patent application Ser. No. 08/930,238 filed Nov. 6, 1997 now abandoned, which is a 371 of PCT/AU96/00774 filed Dec. 3, 1996.

FIELD OF THE INVENTION

This invention relates to a settable composition and especially to an inorganic settable composition which can be mixed with fillers and additives to provide a range of set compositions.

BACKGROUND ART

Cements are well known, and inorganic cements, such as Portland Cement, are well known and used to form mortar, concrete, and the like.

A drawback with Portland Cement is its relatively high weight per unit of volume. Another disadvantage with Portland Cement is that it is not suitable to use with fillers which are organic in nature. That is, Portland Cement is more or less limited to use with mineral type fillers. Thus, Portland Cement will not readily bind with fillers containing soils and clays. This means that gravel and sand when used as fillers for Portland Cement must be thoroughly washed and free from salts, humus, clay and certain types of acid.

Another disadvantage with Portland Cement is that the mix water must be clean and free from contamination. Salt water, bore water, brackish water, and water containing a high percentage of other types of salts cannot be used as a mix water with Portland Cement.

Another known type of cement is a magnesium oxychloride cement (Sorel cement) which is a cement used in interior work such as floors in hospitals and public buildings. This cement is made by adding in proper proportions a strong solution of magnesium chloride to magnesia. This cement can be used with organic fillers such as wood flour, cork, and inorganic fillers, such as stones, to provide a set mass in a short period of time which can take a high polish. These oxychloride cements can also use other types of organic fillers such as wood shavings, sawdust and straw.

Disadvantages with magnesium oxychloride cements are their brittleness, porosity and low shelf life. Another disadvantage with this type of cement is that it is not easily handled and is not like Portland Cement which is a dry flowable powder which is relatively easy to handle and use. A further disadvantage is that magnesium oxychloride cements are unstable in water and lose strength on prolonged exposure to water.

Another type of cement is a magnesium oxysulphate cement which is weaker than a magnesium chloride cement, and is obtained by the reaction of magnesium oxide with an aqueous solution of magnesium sulfate. The cements are unstable in water.

OBJECT OF THE INVENTION

The present invention is directed to a settable composition which, in the dry form, can be in the form of a powder which can be handled more or less like Portland Cement powder and which can be mixed with various fillers and water to obtain a set or hardness.

The present invention is also directed to the use of certain types of additives to the composition which can allow a set to be obtained with contaminated water, and where fillers, such as organic fillers, can be used.

The present invention is also directed to various products of the composition and various uses of the composition.

In one form the invention resides in a settable composition, the composition comprising a calcium carbonate and a caustic magnesium oxide.

The term caustic magnesium oxide includes a magnesium composition which comprises magnesium carbonate and a decarbonated magnesium. The term also covers a magnesium carbonate which has been treated, for instance, by heating, to liberate carbon dioxide, thereby forming a composition which is partially calcined. The exact structure of the composition and of the caustic magnesium oxide is not known, but the term will be used to include the structure formed by heating magnesium carbonate to partially decarbonate it, especially at the temperature ranges described.

The composition of calcium carbonate and caustic magnesium oxide can be formed by treating dolomite. Dolomite is a calcium magnesium carbonate found in nature. A true dolomite comprises about 54% calcium carbonate and 43% magnesium carbonate. Natural dolomites contain impurities of various differing types which can include alumina, iron and silica.

The percentage of the calcium and magnesium carbonate can vary in dolomites. For instance, dolomite containing 65% calcium carbonate and 30% magnesium carbonate is called a low magnesium dolomite. Conversely, a dolomite containing 60% magnesium carbonate and 30% calcium carbonate is called a high magnesium dolomite.

It is found that heating dolomite will cause carbon dioxide to be liberated, and the rate of liberation or carbon dioxide can be controlled and varied to provide fully or partially calcined dolomites.

If the dolomite is heated at 1,500° C., all the carbonate is liberated as carbon dioxide and a mixture of calcium oxide and magnesium oxide is left. These oxides are well known as for use in refractory material, but the oxides are not suitable for a cementitious material.

If dolomite is heated at a lower temperature, not all of the carbonate decomposes to liberate carbon dioxide. Indeed, it is noted that the heating can be controlled such that the magnesium carbonate preferentially releases carbon dioxide over the calcium carbonate.

Thus, heating at a temperature range of typically between 500° C. to 800° C. will cause preferential decomposition of the magnesium carbonate.

By controlling the preferential decomposition, dolomite can be treated to form a settable composition by converting the dolomite into a composition comprising a calcium carbonate and a caustic magnesium oxide.

The preferential decomposition of dolomite can be enhanced by additives such as inorganic salts. A suitable salt is sodium chloride which can be added from 0.1%–15% prior to heating. The salt appears to preferentially decrease the decarbonisation temperature of $MgCO_3$ without substantially affecting the higher decarbonisation temperature of $CaCO_3$. The salt can increase the differential temperature from 100° C. to 200° C.

Suitably, the caustic magnesium oxide has between 2%–50% of the carbon dioxide retained within the magnesium carbonate, and preferably between 23%–28%. While the molecular structure may be difficult to envisage, the structure may comprise a mix of calcium carbonate, magnesium oxide, and magnesium carbonate. The amount of carbon dioxide retained in the composition has an effect on various parameters such as hardness, and setting rare. Between 20%14 30% retained carbon dioxide offers a suitable set rate for many applications. Increasing the amount of carbon dioxide decreases the set rate, and decreasing the amount of carbon dioxide increases the set rate.

The composition can also be prepared synthetically by mixing or blending calcium carbonate with preformed caustic magnesium oxide. In this variation, the caustic magnesium oxide can be prepared by subjecting magnesium carbonate to heat to partially drive off carbon dioxide until the desired level of calcination is obtained.

Test results have shown that when heating naturally occurring dolomite, or a synthetic blend of calcium carbonate with magnesium carbonate, within the temperature range of 500° C. to 800° C. to partially drive off carbon dioxide, and neither the dolomite nor the synthetic blend contain more than 14% calcium carbonate, less than 1.5% "free lime" (CaO) is produced. The free lime can only come from calcining the calcium carbonate, not the magnesium carbonate, so a concentration of 1.5% free lime indicates negligible effect of the calcining process on the calcium carbonate. That is, the calcining is truly preferential in that essentially only the magnesium carbonate is calcined. A concentration of over approximately 5% free lime is detrimental to the setting process and gives rise to a weaker and more chalky product with time.

In a further variation, a natural dolomite may be heated in the manner described above to provide a composition comprising calcium carbonate and caustic magnesium oxide, and if the natural dolomite is magnesium deficient (for instance, a low magnesium dolomite), additional caustic magnesium oxide can be added to the mixture.

For example, a low magnesium dolomite ore containing 65% calcium carbonate and 30% magnesium carbonate plus impurities can be calcined so that the magnesium converts to partially calcined caustic magnesium oxide but essentially where between 2%–20% of the original entrained carbon dioxide within the magnesium is retained.

By being able to add caustic magnesium oxide, an calcium carbonate, and being above to vary the blend of the two, it is possible to provide compositions for use as cement having any required predetermined weight or percentage of the blended materials.

The particle size of the composition can be varied if desired. A suitable particle size of 50–70 micron with 90% passing through a 60 micron sieve allows the composition to be used in a variety of applications. The composition can be ground to the particle size if required and this can be done before or after treatment. Other particle size ranges are also envisaged such as from 10–1000 microns.

A range of 10%–90% caustic magnesium oxide and 90%–10% calcium carbonate can be used, with a preferred mix being 60%–70% magnesium and 30%–40% calcium.

For instance, one tonne of dolomite will contain 650 kilograms (kg) of calcium carbonate ($CaCO_3$) and 300 kg of magnesium carbonate ($MgCO_3$) plus 5% impurities. The magnesium carbonate will contain 156:57 kg of $CO_2$. When 95% of this $CO_2$ is removed the weight loss will be 148:74 kg. The calcined weight of the dolomite will now be 851:26 kg which will include 650 kg of calcium carbonate plus 143:3 kg of magnesia oxide and 50 kg of impurities. ($CaCO_3$ 650 kg/MgO 143:43 kg+7:8285 kg+impurities 50 kg=851:26.)

EXAMPLE $$\text{Dolomite } 1000 \text{ kg} = \frac{650 \text{ kg } CaCO_3 \text{ before calcination}}{300 \text{ kg } MgCO_3 + 50 \text{ kg impurities}}$$

$$\text{After calcination} = \frac{650 \text{ kg } CaCO_3}{151:258 \text{ kg caustic } (MgO + 7:8CO_2) +}$$
desired weight of selected caustic magnesia oxide + impurities 50 kg Useful compositions can be formulated where the caustic magnesium oxide is from 2% of the weight of the calcium carbonate to 300% the weight of the calcium carbonate.

The composition can be formulated as a dry fine powder (that is similar to the Portland Cement powder).

To the composition can be added various additives. The additive or additives may accelerate the formation of strong binding agents, and may assist in the recrystallisation of the composition to make it set. In the setting process, various added fillers (which can include organic fillers, inorganic fillers, solid and liquid fillers, radioactive fillers, toxic fillers, and the like) can be trapped in the set matrix. One additive can comprise a sulphate which may be added at rates of between 0.01% up to 10%. A suitable sulphate can comprise sulphuric acid, or a metal sulphate such as magnesium sulphate or aluminium sulphate.

Another desirable additive is one which act as a source of carbonation in the composition to assist in the setting process. A carbonate which can decompose or react to liberate carbon dioxide is preferred. One suitable additive can be a metal carbonate such as sodium carbonate. Another suitable additive can include a carboxylic or polycarboxylic acid which can react to liberate carbon dioxide. Another advantage of sodium carbonate is that it will neutralise any free lime (CaO), over 5% free lime being detrimental to the setting process, and which is found in certain types of fillers which may be used (for instance coal ash).

Other additives may include citric acid, lemon acid, acetic acid, glycolic acid, oxalic acid, other di or poly carboxylic acids, or other acidifying agents. These additives may be added at between 0.01%–5%. If the additives (such as citric acid or lemon acid) are solids, they are suitably pre-ground and powdered to enable them to be efficiently blended with the remainder of the composition. A grind size<250 mesh can be used. The aluminium sulphate may be commercially available aluminium sulphate having a hydration figure of 14. Of course, higher or lower hydrated aluminium sulphates can also be used with the appropriate weight adjustments.

Another acidifying agent may comprise sulphuric acid and this may be added to the water mixture in up to 5% by weight.

In a preferred feature, the additives include aluminium sulphate and a citric acid (or equivalent acid such as glycolic acid or acetic acid). Additionally, a salt such as sodium chloride can be provided.

Suitably, the additives are premixed and added to the composition. The amount of premix added can vary for instance from about 3%–10% or more. It appears that when fillers of small size (for example below 70 micron) are used, the amount of premix added should be larger (about 10%), while fillers of larger size allow less premix to be added (e.g. 3%–7%).

If the premix comprises (a) aluminium sulphate, (b) an organic acid and (c) a salt, it is preferred that (a) is present between 40%–80%; (b) is present between 10%–60% and (c) is present between 1%–20%.

While not wishing to be bound by theory, it appears that ingredient (a) provides early strength to the set composition, and may assist in the formation of brucite ($MgOH_2$), and a gelatinous polymer of aluminium hydroxide, both which help with initial bonding of the composition. It also appears that (a) provides water proofing properties.

Ingredient (b), for instance citric acid, appears to assist in the carbonisation of MgO and $Mg(OH_2)$ to recrystallise the composition into a set material. The acid may also act as a ligand to form complexes around the fillers (for instance metal ions) helping to trap them in the setting or set matrix. The carbonisation process can continue over a long period of time which can provide long lasting strength to the set material. Ingredient (c) appears to assist in achieving an early strength to the composition.

BEST MODE

Embodiments of the invention will be described with reference to the following examples:

Example 1

A dolomitic binder composition consisting of a quantity of natural occurring dolomite ore, which before calcination, contained 54% by weight of calcium carbonate ($CaCO_3$), and 43% by weight of magnesium carbonate ($MgCO_3$) and 3% by weight of entrained impurities of any type. The said dolomite ore having been partially calcined so as to remove only 95% of the weight of carbon dioxide ($CO_2$) contained within the magnesium carbonate. The quantity of ore after calcination to consist of 54% by weight of calcium carbonate ($CaCO_3$) and 20:16% of partially calcined caustic magnesia oxide (19.12% MgO+1:04% $CO_2$) and 3% of impurities. The said quantity of partially calcined dolomite ore having been crushed and ground to a fineness of 250 mesh. The blending with the quantity of partially calcined powdered dolomite ore 5% by weight of alumina sulphate ($A12(SO_4)3$) and 1% by weight of citric acid (C6H807) both of which have been powdered to 250 mesh. The mixing of all of the said materials with a quantity of liquid or water of any type so as to create a slurry of any predetermined viscosity. The slurry can be mixed with any required type and quantity of preselected inorganic or organic fillers or combination of fillers. The pouring, moulding, extruding, pressing, gunning of the entire admixture will create upon drying and setting a vast range of excellent and attractive building products.

Example 2

A cementitious dolomitic binder composition consisting of a selected quantity of pre-calcined crushed and powdered 250 mesh sieve low magnesium dolomite calcined so as the caustic magnesia oxide (MgO) contained within the dolomite contains between 2% and 20% by weight of carbon dioxide ($CO_2$) as a predetermined uncalcined content, to which is added a pre-selected weight of caustic magnesia oxide (MgO) as a commercially available independent mineral product which has been selectively precalcined so as to contain similar quantities of carbon dioxide ($CO_2$) as the caustic magnesia oxide (MgO) contained in the dolomite. The weight of the added caustic magnesia oxide (MgO) is between 1% of and three times the weight of partially calcined caustic magnesia oxide contained within the dolomite constituent of the mixture. Selected quantities of ingredients such as alumina sulphate, citric acid water and fillers can be added in the same manner as described in Example No. 1

Example 3

A dolomitic binder composition was created with a predetermined quantity of commercially available and selectively pre-calcined magnesia oxide mixed with the dolomite.

Example 4

A dolomitic binder composition is prepared in the same manner as described in Example No. 1 except that a measured quantity of between 1% and 20% of sulphuric acid ($H_2SO_4$) is added to the mixing water. The resultant concrete-like slurry exhibited a good strength and attained an initial set within two hours.

Example 5

A further dolomitic binder composition can be prepared in the same manner as described in Example No. 2 but with the same weight of Sulphuric Acid ($H_2SO_4$) as described in Example No. 3 being added.

Example 6

The composition of Example 1 or Example 2 was mixed with between 3%–10% by weight of aluminium sulphate. The mixture achieved a initial set having a good strength, but it was found that the strength deteriorated after only a few months possibly due to poor crystallisation by carbonation.

Example 7

The composition of Example 1 or Example 2 was mixed with an additive mixture consisting of aluminium sulphate and sodium chloride. The total additive mixture was between 3%–10% and the aluminium sulphate ratio was between 60%–99% with the sodium chloride ratio being between 1%–40%. The composition achieved a good set but initially had a high water porosity. The set strength deteriorated after a few months, again possibly due to poor carbonation, but indications were that the water porosity of the set product decreased giving moderate water absorption.

Example 8

The composition of Example 1 or Example 2 was mixed with two additives being aluminium sulphate and citric acid. The total additive range was between 3%–100% and of that, aluminium sulphate was about 80% with citric acid being about 20%. The set material gave a good strength with the strength increasing after 30 days and provided excellent long term stability. The set product also had early low water porosity.

Example 9

This example shows the suitability of this composition as an encapsulating agent for hazardous wastes. Hazardous wastes (such as toxic metals) must be stabilised before disposal and require encapsulation in a material where leaching of the toxic material is below pre-set levels.

In this example, 100 kg of a dolomitic binder of Example 1 or Example 2 was mixed with 650 g of aluminium sulphate, 250 g of citric acid, and 100 g of sodium chloride. The material was mixed with water and mixed with toxic metals being arsenic, cadmium, copper, iron, lead, selenium, silver and zinc. The maximum allowable leaching of each of these toxic metals is arsenic 5 mg p/liter, cadmium 1 mg p/liter, copper 100 mg p/liter, iron 100 mg p/liter, lead 5 mg p/liter, selenium 1 mg p/liter, silver 5 mg p/liter and zinc 100 mg p/liter.

The set material encapsulating the toxic metals was subject to a leach condition which consisted of a 24 hr stirred leach in a buffered mild acid solution. The leach was examined and was found to contain less than 0.1 mg p/liter of arsenic, no cadmium, less than 0.1 mg p/liter copper, between 0.05–0.23 mg p/liter iron, less than 0.1 mg p/liter lead, no selenium, no silver, and less than 0.2 mg p/liter of zinc.

The results show that the dolomitic set composition has excellent properties in encapsulating and retaining toxic metals, with the leaching properties being a fraction of the maximum allowable concentration.

Example 10

The dolomitic binder composition of Example 1 or Example 2, 100 kg was mixed with 800 g of aluminium sulphate and 200 g of citric acid. Water was added to the mix as was radioactive charcoal waste. The mix was hardened and was found to encapsulate and retain the radioactive charcoal without appreciable loss.

Example 11

The dolomitic binder of Example 1 or Example 2, 1,000 kg was mixed with 800 g of aluminium sulphate and 200 g of citric acid. Water was added as was a filler.

The mixture was formed into a brick which was heated in steps up to 1,000° C. to check for flammability. The brick did not catch alight, only turning to ash in the outside 1 cm of the brick. Post -v- pre-heating weight indicated a 40% loss of weight. The example shows that this type of brick is not a fuel and does not promote a fire.

Example 12

A composition similar to that of Example 10 or 11 was formed, without the filler. The composition was formed into a roof tile and subjected to mechanical tests. The required breaking load needed to exceed 700N, and the actual breaking load was found to be 1,600–2,600N showing that the composition has excellent properties as a roof tile. Additionally, the water permeability of the formed tile was investigated by forming a projected surface on top of the tile and filling it with water to 12 mm. The test was maintained for 2 hours and a visual examination of the tile showed that the tile was sufficiently water impermeable.

Example 13

A dolomitic composition of Example 1 or Example 2 (100 kg), was mixed with aluminium sulphate 500 g and citric acid 200 g. Water was added to form a slurry and to one part of the slurry was added three parts of paper pulp and 50 ml acrylic. The product was allowed to set, formed into a cube and subject to compressive strength analysis which showed that the cube had a compressive strength of 31 MPa, showing it to have a good load bearing strength.

Example 14

A dolomitic composition of Example 13 was made up this time having two liters of dolocrete slurry mixed with four parts of newspaper pulp. The formed cube had a compressive strength of between 14–17 MPa.

Example 15

To a dolomitic composition, 1 l was added 2 l of volcanic ash and 10 ml acrylic, the mixture was set and formed into a cube and had a compressive strength of between 11–20 MPa.

Example 16

To a dolomitic composition, 3 l was added 3.251 of shredded paper and 1 l of No. 4 vermiculite. The mixture was set, formed into a cube and had a compressive strength of 11–12 MPa.

Example 17

To 3 l of dolomitic composition was added 0.5 l of paper and 0.5l of vermiculite grade 4. The material was set, formed into a cube and was found to have a compressive strength of 23.5–24.5 MPa.

Example 18

To a dolomitic composition, 2 l was added 1.5 l cracker dust and 0.5 l blue metal. A cube formed from the set composition had a compressive strength of 19.5–20 MPa.

Example 19

To 2 l of dolomitic composition was added 2 l of shredded car tires. A formed cube had a compressive strength of 5.5–6.5 MPa.

Example 20

To 1 l of dolomitic composition was added 3 l of course blue metal gravel and 1 l of sand. A formed cube had a compressive strength of 26.5–28.5 MPa.

Example 21

To 1.5 parts dolomitic composition was added 2.5 parts course sawdust, 0.5 parts paper pulp and 50 ml acrylic. A formed cube was found to have a compressive strength of 27–29 MPa.

Example 22

To 1.5 parts dolomitic binder composition was added 2.5 parts course sawdust, 1 part find sawdust, 1 part paper pulp and 50 ml acrylic. A formed cube had a compressive strength of 19.5–22.5 MPa.

Example 23

To 1.5 ml dolomitic composition was added 0.5 parts power house ash, 0.5 parts paper pulp and 50 ml acrylic. A formed cube had a compressive strength of between 23.5–24.5 MPa.

Example 24

To two parts dolomitic binder composition was added two parts coarse sawdust, two parts paper pulp and 0.5 parts acrylic. A formed cube was found to have a compressive strength of between 14–17.5 MPa.

Example 25

To 2.5 parts dolomitic composition was added two parts paper fines No. 1, two parts paper fines No. 2, and two parts course sawdust and 0.7 parts acrylic. A cube formed has a compressive strength of between 20–22.6 MPa.

Example 26

To a dolomitic composition, one part was added two parts of beach sand. The composition was mixed with seawater to form a settable composition and was formed into a cube. The cube was about 77 mm along each edge and a compressive strength of 28.5–29.3 MPa was found.

Further tests have shown that the composition can be admixed with various fillers and reinforcing agents to provide a number of suitable commercial products. Suitable fillers include but are not limited to power station ash, volcanic ash, alumina, red mud, crushed rock, sand, coral, pumice, glass, cenospheres, perlite, vermiculite, styrene bead, sawdust, shredded rubber, straw, rice husk, coconut fibre, wood chip, wood bark, paper, cardboard, plastic, concrete rubble, soil, lead concentrate, litharge, lead wool, boron, lithium, cadmium, L A batteries, metal dusts and chemically precipitated gypsum. Suitable reinforcing agents can include steel, glass fibre, carbon fibre, kevlar, SRImonomer, polypropylene, rock wool, cotton and straw. The following products can be made—brick, block, pavers, tile, mortars, pipe, board, panel, cladding, paving, structures, statues, monuments, sleepers, posts, poles, tanks, boats, piles, wharves and marinas.

The composition according to the invention can be prepared as a dry flowable powder which can be bagged and stored indefinitely. To the powder can be added fillers such as sand and gravel (known fillers), but unlike Portland Cement, organic fillers such as straw, cork, wood flour, sawdust, and the like, can also be added. Water can be added to the mix to form a mortar, trowelable material, or a concrete, and unlike Portland Cement, the water can be brackish, salt water, and does not need to be perfectly clean.

It should be appreciated that various other changes and modifications can be made to the embodiment described without departing from the spirit and scope of the invention.

What is claimed is:

1. A settable binder composition, consisting essentially of a mixture of a calcium carbonate and a caustic magnesium oxide, the mixture selected from the group consisting of:
    (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate, and calcium carbonate ($MgO$, $MgCO_3$, and $CaCO_3$); and,
    (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$).

2. The composition of claim 1, wherein the dolomite is a magnesium deficient dolomite and to which is added additional caustic magnesium oxide.

3. A settable binder composition, the composition consisting essentially of a mixture of a calcium carbonate and a caustic magnesium oxide, the mixture selected from the group consisting of
    (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate and calcium carbonate ($MgO$, $MgCO_3$ and $CaCO_3$); and,
    (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$), and, wherein 0.1%–15% of a suitable inorganic salt is added to enhance the preferential decarbonization of the magnesium carbonate.

4. The composition of claim 1, wherein the caustic magnesium oxide has between 2%–20% of the carbon dioxide retained within the magnesium carbonate.

5. The composition of claim 4, wherein the composition has a particle size of 50–80 micron with 90% passing through a 160 micron sieve.

6. A settable binder composition, the composition consisting essentially of a mixture of a calcium carbonate and a caustic magnesium oxide, the mixture selected from the group consisting of:
    (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate and calcium carbonate ($MgO$, $MgCO_3$ and $CaCO_3$); and,
    (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$); and, further including a sulfate additive present between 0.01% up to 10%.

7. The composition of claim 6, wherein the sulfate additive is selected from the group consisting of: (a) sulfuric acid (b) magnesium sulfate and (c) aluminum sulfate.

8. A settable binder composition, the composition consisting essentially of a mixture of a calcium carbonate and a caustic magnesium oxide, the mixture selected from the group consisting of:
    (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate and calcium carbonate ($MgO$, $MgCO_3$ and $CaCO_3$); and, (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$); and, further including a carbonate additive which produces a source of carbonation during the setting process.

9. The composition of claim 8, wherein the carbonate additive is selected from the group consisting of: (a) sodium carbonate; (b) citric acid; (c) lemon acid; (d) acetic acid; (e) glycolic acid; (f) oxalic acid; acids (b)–(f) being able to react to liberate carbon dioxide.

10. The composition of claim 9, wherein the carbonate additive is present between 0.01%–5%.

11. A settable binder composition, the composition consisting essentially of a mixture of a calcium carbonate and a caustic magnesium oxide, the mixture selected from the group consisting of:
   (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate and calcium carbonate ($MgO$, $MgCO_3$ and $CaCO_3$); and,
   (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$); and, further including the following additives: (i) aluminum sulfate and (ii) a carboxylic acid, the additives comprising about 3% to about 15% of the composition.

12. A settable binder composition, the composition consisting essentially of a mixture of a calcium carbonate and a caustic magnesium oxide, the mixture selected from the group consisting of:
   (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate and calcium carbonate ($MgO$, $MgCO_3$ and $CaCO_3$); and,
   (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$); and further including the following additives: (i) aluminum sulfate, (ii) a carboxylic acid and (iii) a salt, wherein (i) is present between 40%–80%; (ii) is present between 10%–60% and (iii) is present between 1%–20% of the additives, the additives comprising about 3% to about 15% of the composition.

13. A settable binder composition, the composition consisting essentially of a mixture of a calcium carbonate and a caustic magnesium oxide, the mixture selected from the group consisting of:
   (a) a naturally-occurring dolomite, wherein the dolomite is heated at a temperature within the range of 500° C. to 800° C. to cause preferential decarbonization of the magnesium carbonate by liberating carbon dioxide, whereby between 2% to 50% of the carbon dioxide is retained within the magnesium carbonate without substantially decarbonizing the calcium carbonate resulting in a mixture of magnesium oxide, magnesium carbonate and calcium carbonate ($MgO$, $MgCO_3$ and $CaCO_3$); and,
   (b) a synthetic blend formed by mixing calcium carbonate with preformed caustic magnesium oxide, the preformed caustic magnesium oxide being prepared by heating magnesium carbonate to 500° C. to 800° C. to partially drive off carbon dioxide whereby between 2% to 50% of the carbon dioxide is retained within the magnesium carbonate, and wherein the calcium carbonate retains substantially all of its carbon dioxide resulting in a mixture of magnesium oxide, magnesium carbonate and calcium carbonate ($MgO$, $MgCO_3$ and $CaCO_3$); and further including a sulfate additive present between 0.01% up to 10% and at least one filler.

14. The composition of claim 13, wherein the filler comprises between 3–90% of the total composition.

15. The composition of claim 14, wherein the at least one filler is selected from the group consisting of power station ash, volcanic ash, alumina, red mud, crushed rock, sand coral, pumice, glass, cenospheres, perlite, vermiculate, styrene bead, sawdust, shredded rubber, straw, rice husk, coconut fiber, wood chip, wood bark, paper, cardboard, plastic, concrete rubble, soil, lead concentrate, litharge, lead wood, boron, lithium, cadmium, L A batteries, metal dusts and chemically precipitated gypsum, steel, glass fiber, carbon straw and mixtures thereof.

16. An article of manufacture comprising a set composition of claim 1.

17. An article of manufacture comprising a set composition of claim 12.

18. The article of claim 16, wherein the article is selected from the group consisting of a brick, block, paver, tile, mortar, pipe, board, panel, cladding, paving, structure, statue, monument, sleeper, post, pole, storage tank, boat, pile, wharf and marina.

19. The composition of claim 1, wherein the mixture of calcium carbonate and caustic magnesium oxide contains up to 14% calcium carbonate, and wherein after heating to cause preferential decarbonization of the magnesium carbonate less than 1.5% free lime is produced.

20. The composition of claim 1, wherein the caustic magnesium oxide has between 23% to 28% of the carbon dioxide retained within the magnesium carbonate.

* * * * *